United States Patent [19]
Chakrabarti et al.

[11] Patent Number: 5,900,087
[45] Date of Patent: May 4, 1999

[54] PREPARATION OF FLEXIBLE, FLAME-BONDABLE POLYURETHANE-POLYETHER FOAMS HAVING IMPROVED ADHESION

[75] Inventors: Sarbananda Chakrabarti, Mannheim; Klaus Wagner, Hessheim, both of Germany

[73] Assignee: BASF Aktiengesellschaft, Ludwigshafen, Germany

[21] Appl. No.: 08/879,290

[22] Filed: Jun. 19, 1997

[30] Foreign Application Priority Data

Jun. 21, 1996 [DE] Germany .................. 196 24 876

[51] Int. Cl.⁶ .................... C08G 18/00; C08J 9/36
[52] U.S. Cl. .................... 156/82; 156/326; 156/427; 521/55; 521/116; 521/117; 521/170; 521/174; 521/918
[58] Field of Search .................. 156/82, 326, 427; 521/55, 116, 117, 170, 174

[56] References Cited

U.S. PATENT DOCUMENTS

| | | |
|---|---|---|
| 3,304,273 | 2/1967 | Stamberger . |
| 3,855,048 | 12/1974 | Bagnall ........................ 156/82 |
| 4,051,288 | 9/1977 | Wilson et al. ................. 156/82 |
| 4,147,829 | 4/1979 | Holland ........................ 156/82 |

FOREIGN PATENT DOCUMENTS 42 36 767 A1  5/1994  Germany .

Primary Examiner—Morton Foelak
Attorney, Agent, or Firm—Fernando A. Borrego

[57] ABSTRACT

A flexible, flame-bondable polyurethane-polyether block foam is prepared by a process in which at least one diol is added to the block foam.

15 Claims, No Drawings

PREPARATION OF FLEXIBLE, FLAME-BONDABLE POLYURETHANE-POLYETHER FOAMS HAVING IMPROVED ADHESION

The present invention relates to a process for the preparation of flexible, flame-bondable polyuarethane-polyether block foams.

The flame bonding of flexible foams is used in general for the preparation of systems comprising polyurethiane (PUR) flexible foams laminated with various sheet-like materials, for example textiles, plastics films, papers, etc. The surface of the foam is treated with a flame. This surface region then forms a melt which, in the form of an adhesive film, is brought into contact with the other materials. The melt solidifies in general after a few seconds or minutes, giving a firm bond.

Foams based on polyesterpolyols are by their nature generally very readily flame-bondable. However, such PUR ester foams are inferior to the known PUR ether block foams in a number of properties, for example the open-pore character, their flexibility and their resistance to moisture and heat.

Compared with the polyester foams, PUR-polyether block foams have unsatisfactory flame bonding properties since the melt formed on application of a flame to the surface frequently solidifies only after some time, and moreover the adhesive force of the bond thus produced is generally very much weaker than in the case of the polyester foams.

In order to eliminate this disadvantage, it is usual to prepare PUR-polyether block foams with the addition of special assistants and thus to improve both the flame bonding properties as such and the adhesion between the PUR-polyether block foams and the covering materials.

For example, the product Polyurax Polyol U-15.03 sold by Dow Chemicals under the trade name Dow HT303 contains a modified polymer polyol for improving the flame bonding properties.

In the product Desmophen PU3175 sold by Bayer AG, the flame bonding properties of the PUR flexible foam were improved by adding a modified polyetherpolyol.

German Laid-Open Application DE-A 4,236,767 proposes the addition of PUR ester foams in powder form in order to improve the flame bonding properties of PUR-polyether block foams.

As described above, the addition of PUR ester foams adversely affects, inter alia, the resistance of PUR-polyether block foams to moisture and heat. Furthermore, it should be noted that the relatively high viscosity of the PUR ester foams may have an adverse effect on the processing properties of PUR-polyether block foams.

It is an object of the present invention to provide a process which permits the preparation, in a simple manner, of flexible, flame-bondable PUR-polyether block foams which have good flame bonding properties, whose adhesion after flame bonding to the substrates is substantially improved and which furthermore have the widely known advantageous properties of PUR-polyether block foams.

We have found that this object is achieved by a process for the preparation of a flexible, flame-bondable PUR-polyether block foam, wherein at least one diol is added to the block foam.

All PUR-polyether block foams, as described, for example, in Kunststoffhandbuch, Volume 7, Polyurethanes, in particular in Section 5.1, may be used in the novel process.

The novel process preferably effects an improvement in the flame bonding properties and the adhesion of PUR-polyether block foams which are obtained starting from filler-containing polyols or mixtures of conventional polyetherpolyols and filler-containing polyols, as described, for example, in Kunststoffhandbuch, Volume 7, Polyurethanes, pages 89/90, in the literature cited there, in particular in Rubber Chem. Tech. 45 (1972), 1467–1481, in German Patent 1,152,536 and in U.S. Pat. No. 3,304,273.

For the purposes of the present invention, the term conventional polyetherpolyols denotes polyetherpolyols which have an OH number of, usually, from 42 to 56 and contain predominantly secondary OH groups.

The filler-containing polyols are to be understood as meaning in particular polymerpolyols, ie. a group of polyol dispersions which are prepared by free radical polymerization of suitable olefinic monomers in the polyether serving as the grafting base. Owing to its high polarity, acrylonitrile is the preferred olefinic monomer for this reaction, but styrene and in particular mixtures of these two monomers are also used. Moreover, other vinyl monomers, such as vinyl acetate, vinyl chloride or acrylates, are also used. The reaction is initiated by free radical initiators, such as azobisisobutyronitrile or benzoyl peroxide, and is carried out at 80–120° C.

The second industrially important group of filler-containing polyethers are the polyurea- and polyhydrazodicarboxamide-polyols. They are likewise produced in situ in the polyol by reaction of further components. In this case, the reactants used are diisocyanates and diamines or hydrazine, which combine by polyaddition to form polyureas or polyhydrazodicarboxamides.

The third group covered by the term filler-containing polyols comprises polyetherpolyols modified by crosslinking agents.

For further details on the preparation of polyols which may be used in the present invention, in particular the filler-containing polyols, reference may be made to the publication cited above, Kunststoffhandbuch, Volume 7, and the literature cited therein, and in particular to Section 3.3.1.1 Füllstoffhaltige Polyole, pages 89/90 from Kunststoffhandbuch, Volume 7, and the literature cited therein.

The term diol used herein is to be understood as meaning preferably both aliphatic diols of the general formula (I)

where n may be an integer from 2 to 18, preferably from 2 to 10, in particular from 2 to 5,
and polymer diols of the general formula (II)

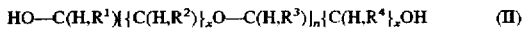

where
$R^1$, $R^2$, $R^3$ and $R^4$, independently of one another, may each be hydrogen, $C_1$–$C_{10}$-alkyl or $C_1$–$C_{10}$-alkoxy, x may be an integer from 1 to 20, preferably from 2 to 10, in particular from 2 to 5, and n may be an integer from 1 to 200, preferably from 10 to 150, in particular from 50 to 100.

The term molecular weight used in the present application relates to the number average molecular weight $M_n$.

Examples of aliphatic diols are 1,2-ethanediol, 1,3-propanediol, 1,4-butanediol, 1,3-butanediol, 1,3-, 1,4- and 1,6-hexanediol, etc., and examples of polymer diols are dipropylene glycol, tripropylene glycol, tetrapropylene glycol, etc., polyethylene glycols whose molecular weights are generally from about 200 to about 10,000, polypropylene glycols whose molecular weights are from about 400 to about 4,000, polypropylene glycol ethoxylates and polypropylene glycol propoxylates whose molecular weights in each case are from about 200 to about 10,000 and polyethylene glycol propoxylates whose molecular weights are likewise from about 200 to about 10,000.

For the purposes of the present invention, polymer diols, in particular polypropylene glycol propoxylates, in each case having molecular weights of from 300 to 1,500, are particularly preferably used, the products sold by BASF Aktiengesellschaft (Ludwigshafen, Germany) under the trade name Lupranol® being particularly preferably used.

It should also be noted that, when the particularly preferred polymer diols are used, the physical properties, for example the tensile strength, of the resulting PUR-polyether block foams are also improved.

Although the amount of diol added is not particularly limited and can be freely chosen depending on the desired hardness of the PUR-polyether block foams, it is in general from about 1 to about 10, preferably from about 3 to about 6, % by weight, based in each case on the total weight of the polyol components.

The present invention furthermore relates to a flexible, flame-bondable polyether-PUR block foam obtainable by a process comprising the addition of at least one diol to said block foam, and to the composite materials which are obtained by flame bonding and subsequent compression using this block foam and which contain the PUR-polyether block foams described above and covering materials, for example textiles, paper webs and plastics films, and also have flame-retardant intermediate layers or may be correspondingly treated by the addition of certain additives. An overview of specific applications in the furniture, vehicle and textile industries appears in Kunststoffhandbuch, Vol. 7, Polyurethanes, Sections 5.1.3.1 to 5.1.3.4.

Furthermore, the present invention relates to a process for the production of a composite material as defined above, wherein the polyether-polyurethane block foam, as the matrix, and the layer applied thereon are linked via the surfaces by flame bonding.

The Examples which follow illustrate the present invention.

EXAMPLES

The following Examples were carried out using the following basic formulation for PUR-polyether block foams:

Polyetherpolyol (OH number (OHN)=48; molecular weight about 3,500), 100 parts by weight Polymerpolyol (OHN=28; molecular weight about 5,500), 10 parts by weight Silicone stabilizer 1.00 part by weight Tertiary amine catalyst 0.35 part by weight Bis(dimethylaminoethyl) ether 0.05 part by weight Tin octoate 0.13 part by weight Water 4.50 parts by weight Isocyanate T80 Characteristic: 105

The abovementioned components of the basic formulation were stirred with a stirrer (speed=1000 rpm) together with the additives listed in Table 1 and then foamed in an open block mold (400×400×40×to 45 mm). The density of the foam was from 22 to 23 kg/m³.

The flame bonding was carried out in the laboratory manually as follows:

Burner: Flat burner (fishtail) 5 cm wide

Gas: Propane gas Distance between flame and foam: 4 cm

Fabric: Knitted fabric/velour, 7 cm wide web which was wound on a reel.

The foam sample was placed on a fire-resistant carriage (aluminum sheet) and was drawn under the flame manually at a speed of about 5 cm/s. The fabric from a reel was laminated with the foam surface only after application of the flame to the foam surface for about 5 cm.

The adhesive strength (peeling tests) was measured according to DIN 53 357, a peeling speed of 50 mm/min being chosen.

The results are shown in Table 1 below:

TABLE 1

| Polyol | Additive | | | Adhesion |
|---|---|---|---|---|
| | Type | Molecular weight | Conc. [%] | [N] |
| Basic formulation | none | — | — | 6–7 |
| | 1,4-Butanediol | 90 | 2 | 9–10 |
| | Dipropylene glycol | 135 | 2 | 8–9 |
| | Tripropylene glycol | 192 | 2 | 8–9 |
| | Polydiol* | 450 | 5 | 12–14 |
| | Polydiol* | 1070 | 5 | 8–10 |

*Propoxylated propylene glycol (Lupranol®)
Foam density: 23 kg/m³

The physical properties of a novel PUR-polyether block foam which had been prepared using Lupranol® 1200 having a molecular weight of 450 were compared with those of a PUR-polyether block foam which had been prepared without this addition. The results, which are shown in Table 2, indicate that the physical properties, such as tensile strength and compressive strength, are also improved by the addition of diols.

TABLE 2

| Polyol | Additive | | Density [kg/m³] | Tensile strength [kPa] | Elongation [%] | Compressive strength [kPa] |
|---|---|---|---|---|---|---|
| | Type | Conc. [%] | | | | |
| Basic formulation | none | none | 23 | 85 | 170 | 3.2 |
| | Lupranol 1200 | 5 | 23 | 120 | 150 | 3.5 |

Furthermore, a PUR-polyether block foam prepared according to the invention using Lupranol 1200 was compared, with regard to the adhesion, with a prior art block foam which had been prepared using a phosphite derivative as stated in Table 3. The results are shown in Table 3.

TABLE 3

| Polyol | Additive | | Adhesion | |
|---|---|---|---|---|
| | Type | Conc. [%] | [%] | Processing |
| Basic formulation | Polydiol (Lupranol 1200) | 5 | 12–14 | good |
| | Phosphite derivative Weston 430 | 2 | 12–14 | good |
| | Weston PTP | 2 | 10–12 | satisfactory |

As is evident from the above Table, the block foams prepared according to the invention are equivalent or superior with regard to tile adhesion properties to the prior art block foams prepared using phosphite derivatives and moreover have no problems with respect to the formation of toxic in compounds during the flame bonding.

We claim:

1. A process for the preparation of a flexible, flame-bonded polyurethane-polyether block foam article, said process comprising:
   admixing conventional polyurethane polyether foam reactants and at least one diol;
   reacting said foam reactants and diol and foaming said foam reactants and diol in a mold to form a polyurethane-polyether block foam; and
   flame bonding a sheet-like material onto a surface of said block foam to form the block foam article.

2. A process as claimed in claim 1, wherein said diol is admixed in an amount of from 1 to 10% by weight, based on the total weight of polyol components in said foam reactants.

3. A process as claimed in claim 1, wherein said diol comprises an aliphatic diol of the formula (I)

$$HO\text{---}(CH_2)_n\text{---}OH \qquad (I)$$

where n is an integer from 2 to 18, or a polymer diol of the formula (II)

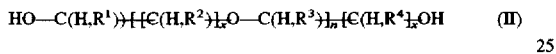  (II)

where
R$^1$, R$^2$, R$^3$ and R$^4$, independently of one another, are each hydrogen,
C$_1$–C$_{10}$-alkyl or C$_1$–C$_{10}$-alkoxy,
x is an integer from 1 to 20, and
n is an integer from 1 to 200,
or a mixture of two or more thereof.

4. A process as claimed in claim 3, wherein said diol is a polymer diol of the formula (II) and has a number average molecular weight of from 300 to 1500.

5. A process as claimed in claim 1, wherein said diol is selected from the group consisting of polyethylene glycol, polyethylene glycol propoxylate, polypropylene glycol, polypropylene glycol ethoxylate and polypropylene glycol propoxylate.

6. A process as claimed in claim 1, wherein the polyurethane-polyether block foam is prepared using at least one filler-containing polyol or a mixture of at least one filler-containing polyol and at least one conventional polyetherpolyol.

7. A flexible, flame-bonded polyurethane-polyether block foam article obtained by the process of claim 1.

8. A process for the preparation of a flexible, flame-bonded polyurethane-polyether block foam article, said process comprising:

(1) reacting
   (a) an isocyanate with
   (b) a polyol and
   (c) a diol,
   in the presence of
   (d) a blowing agent and, optionally,
   (e) a silicone stabilizer,
   (f) a catalyst and
   (g) auxiliaries (2) foaming the reactants in a mold to form a polyurethane-polyether block foam; and (3) flame bonding a sheet-like material onto a surface of said block foam to form the block foam article.

9. A process as claimed in claim 8, wherein said polyol is selected from the group consisting of conventional polyol, filler-containing polyols and mixtures thereof.

10. A process as claimed in claim 8, wherein said diol is an aliphatic diol of the formula (I):

$$HO\text{---}(CH_2)_n\text{---}OH \qquad (I)$$

where n is an integer from 2 to 18, or a polymer diol of the formula (II)

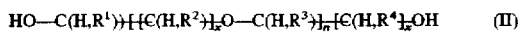  (II)

where
R$^1$, R$^2$, R$^3$ and R$^4$, independently of one another, are each hydrogen,
C$_1$–C$_{10}$-alkyl or C$_1$–C$_{10}$-alkoxy,
x is an integer from 1 to 20, and
n is an integer from 1 to 200,
or a mixture of two or more thereof.

11. A process as claimed in claim 10, wherein said diol is a polymer diol of the formula (II) and has a number average molecular weight of from 300 to 1500.

12. A process as claimed in claim 8, wherein said diol is present in an amount of from 1 to 10% by weight, based on the total weight of the polyol component in said block foam.

13. A process as claimed in claim 8, wherein said diol is selected from the group consisting of polyethylene glycol, polyethylene glycol propoxylate, polypropylene glycol, polypropylene glycol ethoxylate and polypropylene glycol propoxylate.

14. A process as claimed in claim 8, wherein said blowing agent comprises water.

15. A flexible, flame-bondable polyurethane-polyether block foam obtained by the process of claim 8.

* * * * *